(12) United States Patent
Ileogben

(10) Patent No.: US 7,735,236 B1
(45) Date of Patent: Jun. 15, 2010

(54) PULLEY GAUGE

(76) Inventor: Pius O. Ileogben, 255 Brady Walk, Lawrenceville, GA (US) 30045

( * ) Notice: Subject to any disclaimer, the term of this patent is extended or adjusted under 35 U.S.C. 154(b) by 108 days.

(21) Appl. No.: 12/082,117

(22) Filed: Apr. 9, 2008

(51) Int. Cl.
*G01B 5/00* (2006.01)
*G01B 21/00* (2006.01)

(52) U.S. Cl. .......................... 33/679.1; 33/783; 33/806

(58) Field of Classification Search ................ 33/679.1, 33/783, 806
See application file for complete search history.

(56) References Cited

U.S. PATENT DOCUMENTS

| | | | |
|---|---|---|---|
| 987,703 A | 3/1911 | Curtin | |
| 1,287,040 A * | 12/1918 | Junker | 33/679.1 |
| 1,305,562 A * | 6/1919 | Paulsen | 33/679.1 |
| 1,524,474 A | 1/1925 | Buck | |
| 1,661,701 A | 3/1928 | Michler | |
| 2,034,804 A * | 3/1936 | Gamroth | 33/806 |
| 3,063,153 A | 11/1962 | Stites | |
| 3,590,490 A | 7/1971 | Coleman | |
| 3,888,014 A | 6/1975 | Bixler | |
| 4,097,997 A * | 7/1978 | Bjornson | 33/1 SD |
| 4,188,727 A | 2/1980 | Matui | |
| 4,283,858 A | 8/1981 | Sobezak | |
| 4,342,153 A | 8/1982 | Cole | |
| 4,413,418 A | 11/1983 | Anderson et al. | |
| 4,498,239 A | 2/1985 | Epstein | |
| 4,524,854 A | 6/1985 | Miller | |
| 4,683,661 A | 8/1987 | Sommer | |
| 4,741,108 A * | 5/1988 | Cohen | 33/783 |
| 5,548,903 A * | 8/1996 | Johnson et al. | 33/810 |
| 6,279,241 B1 | 8/2001 | Chen | |
| 6,279,248 B1 * | 8/2001 | Walters | 33/784 |
| 6,594,915 B2 | 7/2003 | Matsumiya et al. | |
| 6,782,635 B1 * | 8/2004 | Cappiello, Sr. | 33/828 |
| 6,813,842 B2 | 11/2004 | Wang | |
| 6,990,746 B2 | 1/2006 | Penna et al. | |
| 7,246,450 B1 * | 7/2007 | Mason | 33/784 |
| 7,347,002 B2 * | 3/2008 | Foege | 33/783 |

* cited by examiner

*Primary Examiner*—Christopher W Fulton
(74) *Attorney, Agent, or Firm*—The Law Office of Charlena Thorpe Inc; Charlena Thorpe, Esq.

(57) ABSTRACT

A multifunctional gauge with data and method for changing airflow volume. The gauge has a pair of adjustable opposing fingers for measuring the operating position of a variable pitch pulley and belt width and for verifying the use of a proper belt. The gauge consists of reference charts for use in determining the new operating position of the sheave to change the existing air volume produced by a fan driven by the pulley to a desired air volume.

11 Claims, 5 Drawing Sheets

| 4.75 " Variable Pitch Pulley |||||||||||||||
|------|------|------|------|------|------|------|------|------|------|------|------|------|------|------|
| open | open | a | b | c | d | e | f | g | h | i | j | k | l | m |
| open | 1.00 | 0.97 | 0.95 | 0.93 | 0.90 | 0.88 | 0.86 | 0.84 | 0.82 | 0.80 | 0.79 | 0.77 | 0.76 | 0.74 |
| a | 1.03 | 1.00 | 0.97 | 0.95 | 0.93 | 0.90 | 0.88 | 0.86 | 0.84 | 0.83 | 0.81 | 0.79 | 0.78 | 0.76 |
| b | 1.05 | 1.03 | 1.00 | 0.98 | 0.95 | 0.93 | 0.91 | 0.89 | 0.87 | 0.85 | 0.83 | 0.81 | 0.80 | 0.78 |
| c | 1.08 | 1.05 | 1.03 | 1.00 | 0.98 | 0.95 | 0.93 | 0.91 | 0.89 | 0.87 | 0.85 | 0.83 | 0.82 | 0.80 |
| d | 1.11 | 1.08 | 1.05 | 1.03 | 1.00 | 0.98 | 0.95 | 0.93 | 0.91 | 0.89 | 0.87 | 0.85 | 0.84 | 0.82 |
| e | 1.14 | 1.11 | 1.08 | 1.05 | 1.02 | 1.00 | 0.98 | 0.95 | 0.93 | 0.91 | 0.89 | 0.88 | 0.86 | 0.84 |
| f | 1.16 | 1.13 | 1.10 | 1.08 | 1.05 | 1.02 | 1.00 | 0.98 | 0.96 | 0.93 | 0.91 | 0.90 | 0.88 | 0.86 |
| g | 1.19 | 1.16 | 1.13 | 1.10 | 1.07 | 1.05 | 1.02 | 1.00 | 0.98 | 0.96 | 0.94 | 0.92 | 0.90 | 0.88 |
| h | 1.22 | 1.18 | 1.15 | 1.13 | 1.10 | 1.07 | 1.05 | 1.02 | 1.00 | 0.98 | 0.96 | 0.94 | 0.92 | 0.90 |
| i | 1.24 | 1.21 | 1.18 | 1.15 | 1.12 | 1.10 | 1.07 | 1.05 | 1.02 | 1.00 | 0.98 | 0.96 | 0.94 | 0.92 |
| j | 1.27 | 1.24 | 1.21 | 1.18 | 1.15 | 1.12 | 1.09 | 1.07 | 1.04 | 1.02 | 1.00 | 0.98 | 0.96 | 0.94 |
| k | 1.30 | 1.26 | 1.23 | 1.20 | 1.17 | 1.14 | 1.12 | 1.09 | 1.07 | 1.04 | 1.02 | 1.00 | 0.98 | 0.96 |
| l | 1.32 | 1.29 | 1.26 | 1.23 | 1.20 | 1.17 | 1.14 | 1.11 | 1.09 | 1.07 | 1.04 | 1.02 | 1.00 | 0.98 |
| m | 1.35 | 1.32 | 1.28 | 1.25 | 1.22 | 1.19 | 1.16 | 1.14 | 1.11 | 1.09 | 1.06 | 1.04 | 1.02 | Close |

OPEN SHEAVE TO DECREASE AIRFLOW
CLOSE SHEAVE TO INCREASE AIRFLOW

*Minimum operating position is gauge position m
Maximum change in volume from close is 1.35

PULLEY GAUGE

FIELD

The present invention relates to a measuring device, charts, and procedure configured to simplify the process of changing the volume of air generated by a fan and eliminating the uncertainty of using the wrong belts, specifically fans driven by variable pitch pulley in heating, ventilation, and air conditioning systems.

BACKGROUND

A variable pitch pulley, VPP, installed on a motor to drive a fan pulley provides a means for varying the volume of air produced by a fan. The change in the air volume is accomplished by changing the operating position of the pulley. Depending on the perceived position of the belt in the groove of the pulley, a VPP is characterized as operating in either one of the three modes: full open, closed, or in a middle position. However, this qualitative description of the operating characteristic of a pulley is limited and inaccurate since pulleys can operate in as many as 14 positions depending on its size and the width of the v-belt.

To change the air volume produced by a fan and air ducted into a room, a contractor typically first must access the air handling unit, which may be mounted on the roof of a building. Accordingly, the contractor must gain access to the roof of a building and locate the air handling unit. The contractor then opens a compartment on the air handling unit to disassemble the motor VPP that drives the fan pulley, change the operating position of the VPP, re-assemble the VPP, and close the compartment. Thereafter, the contractor returns to the room and reads the airflow. If the airflow is still inadequate, the contractor must repeat the above process until the desired airflow is achieved. If the air volume cannot be achieved with the pulley already installed, the contractor must buy and install a pulley of a different size and then repeat the above process. Eventually, after the contractor achieves the desired airflow, he must make a final trip to the roof to obtain data from the air handling unit for a report. Then, the contractor inaccurately will report that the VPP is operating in either a full open, closed, or middle position. The present process of changing airflow is laborious, antiquated, slow, and inefficient. Accordingly, there is a need for an efficient means for adjusting airflow and preferably a one step process for adjusting airflow.

Furthermore, there generally is no provision for checking the operating position of a pulley against the belt installed to drive it. More specifically, there are gauges including feeler gauges specifically for measuring the operating circumference of pulleys. Some instruments are available specifically for measuring the wear of the tapered portion of pulleys. There also are calipers, rulers, and tapes for measuring distances and depths with a high degree of accuracy. However, none of these devices measure the operating position of a VPP or verify the use of an adequate belt.

As shown in FIG. 5, a VPP 50 is made of two opposing sheaves 52 and 58. Sheave 52 is secured to the shaft of a motor by means of a removable key, and sheave 58 is secured to the hub 56 of sheave 52 by means of two removable keys formed at 180 degrees apart. The hub 56 of sheave 52 is threaded, thereby providing a track on which sheave 58 moves by rotation. Sheave 58 moves towards or away from sheave 52 by increments of 180 degrees (i.e., a ½ turn). Each of the half turns that comprises the functional length that sheave 58 rides on the hub 56 of sheave 52 represents an operating position of VPP 50. The number of half turns or operating positions of VPP 50 varies by the size of the pulley and belt used to drive VPP 50.

The sides of the sheaves 52, 58 facing each other are formed of tapered portions 62, 64, respectively, beginning from the rims 66, 68 of the sheaves 52, 58, respectively, and transitioning to flat portions 54, 60, of the sheaves 52, 58, respectively, towards the hub 56. The flat portions 54, 60 of the sheaves 52, 58 are parallel to each other. The tapered portions 62, 64 of the sheaves 52, 58 conform to the tapered shape of v-belts that connects the VPP 50 and fan pulley. Accordingly, the tapered portion of the v-belt makes full contact with the tapered portions 62, 64 of the sheaves 52, 58. V-belts come in a plurality of widths, thereby limiting the VPP 50 to a predetermined operating position for the v-belt to maintain full contact with the tapered portion of the VPP 50. Otherwise, the equipment driven by the pulley would perform poorly and the belt would fail prematurely. The use of a wrong belt is one of the primary causes of belts failing prematurely.

SUMMARY

Embodiments of the present invention are used to determine a pulley operating position and to change the airflow from one volume to another in a one step process. Embodiments of the present invention assign a specific identification to each operating position of a VPP. Embodiments of the invention determine the exact operating position of a pulley and the size of the belt that is appropriate at that operating position. Embodiments of the present invention contain a chart for each pulley that provides a means for accurately determining the new operating position of the pulley for a desired change in the volume of airflow.

Both the foregoing general description and the following detailed description are exemplary and explanatory only and are not restrictive of the invention, as claimed.

DETAILED DESCRIPTION

Figure 1:
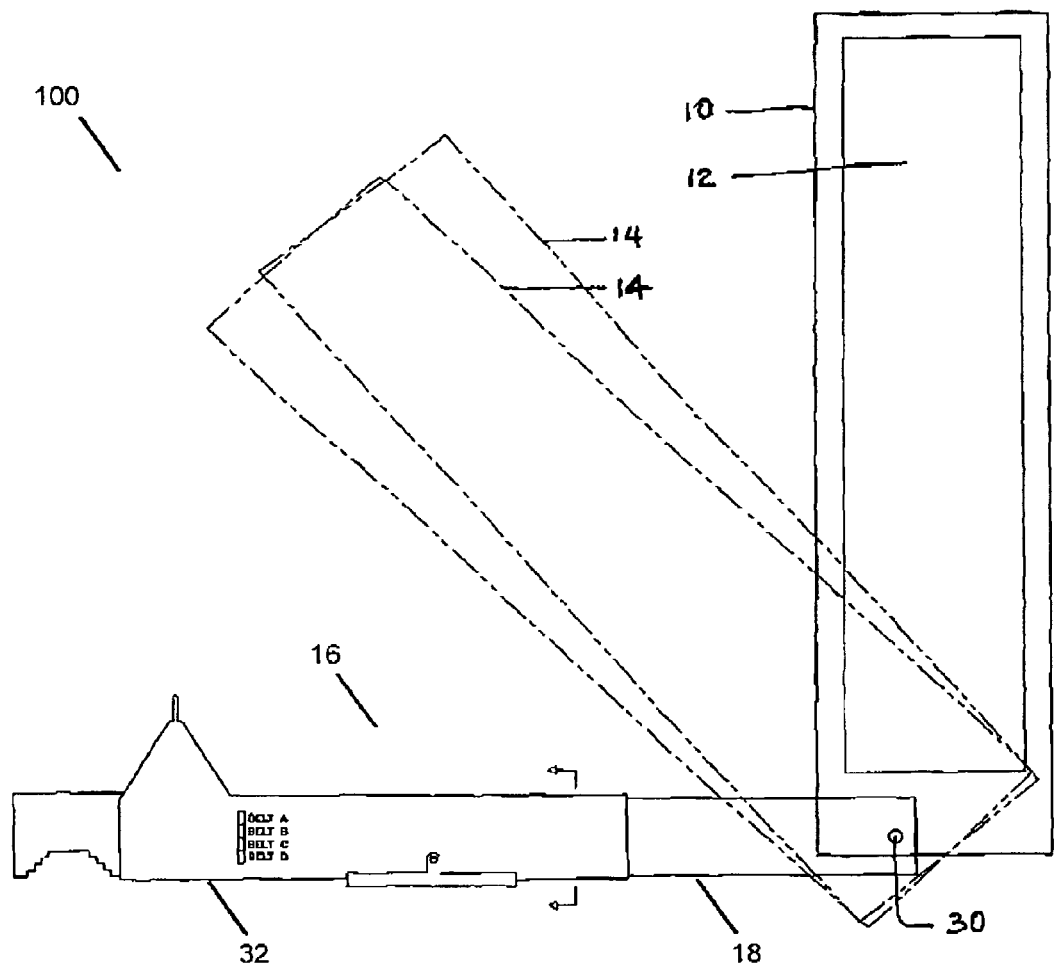
FIG. 1 illustrates a pulley gauge apparatus according to one embodiment of the invention.

FIG. 1 illustrates a pulley gauge apparatus 100 according to a preferred embodiment of the present invention. The pulley gauge apparatus 100 includes a gauge 16 having a fixed gauge member 18 and a sliding gauge member 32, charts 14, and a housing 10. The gauge 16 and the charts 14 are attached to the housing 10 by a device 30. The housing 10 includes a window 12 for viewing and operating a calculator, portable PC, or the like that may be in the housing 10.

Figure 3:
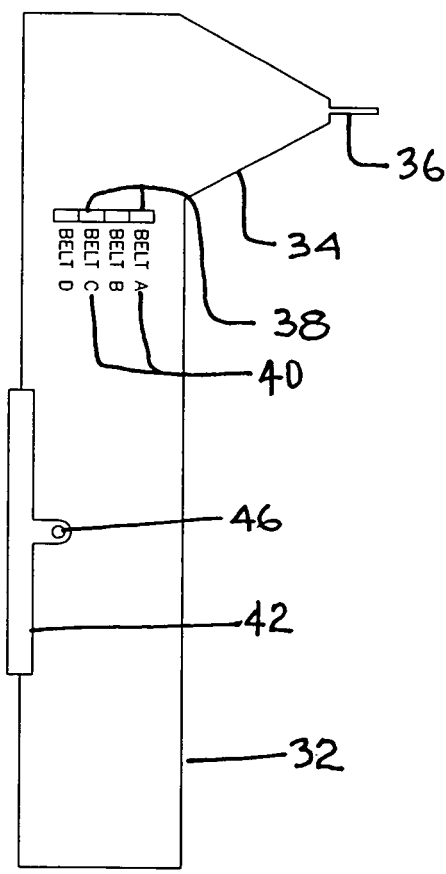
FIG. 3 illustrates a sliding gauge member of the pulley gauge apparatus of FIG. 1.
Figure 2:
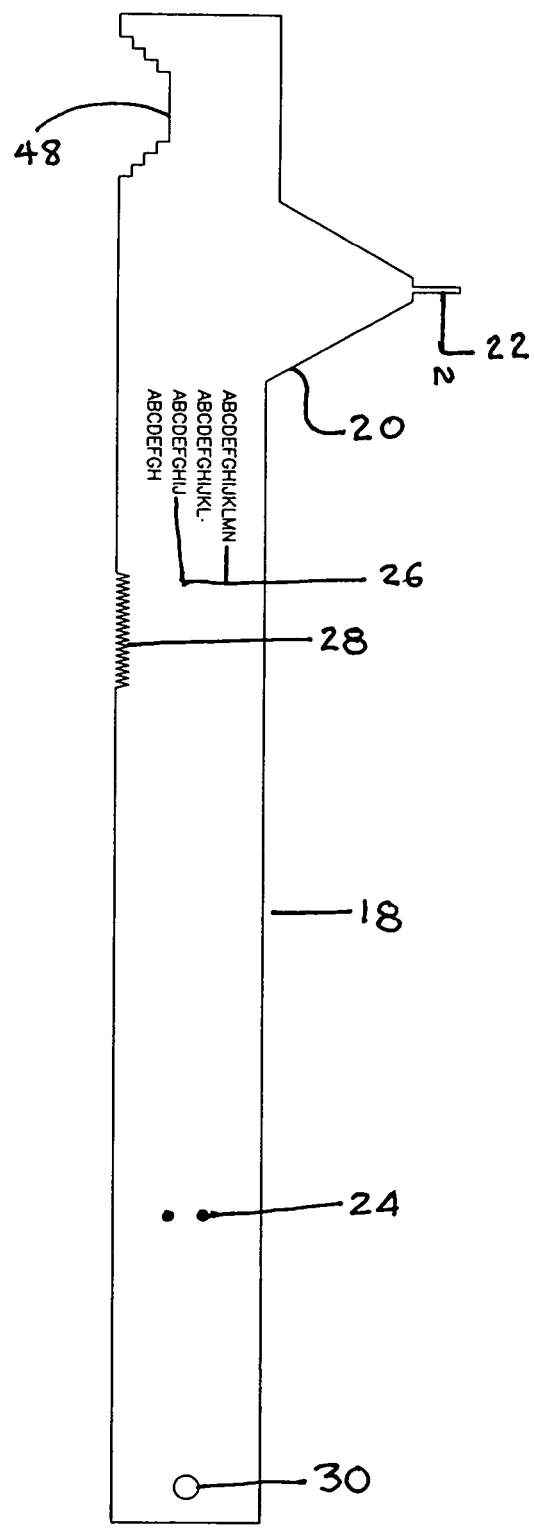
FIG. 2 illustrates a fixed gauge member of the pulley gauge apparatus of FIG. 1.

FIGS. 2 and 3 illustrate the fixed gauge member 18 and sliding gauge member 32, respectively, of the gauge 16 in greater detail. As shown in FIG. 2, the fixed gauge member 18 includes a guard 20, finger 22, limiter 24, pulley operation position indicator 26, rack 28, and belt gauge 48.

As shown in FIG. 3, the sliding gauge member 32 includes a guard 34, finger 36, window 38, belt indicator 40, adjuster 42, and device 46.

Fingers 22, 36 are attached to guards 20, 34 of the fixed gauge member 18 and sliding gauge member 32, respectively. Guards 20 and 34 are tapered to fit the shape of the VPP 50 groove to protect the fingers 22, 36 from damage and also to provide a means to guide the fingers 22, 36 into the void between the sheaves 52 and 58 of FIG. 5.

The limiter 24, which in one embodiment may be studs, limits the movement of sliding gauge member 32 on the fixed gauge member 18.

Pulley operation position indicator 26 includes a plurality of rows with predetermined characters. Each character represents an operating position of the VPP 50 while each row represents a predetermined size of a belt. Window 38 provides a means of viewing the characters of the pulley operation position indicator 26 when the pulley apparatus 100 is in operation. Belt indicator, 40 illustrates the correct size of a belt to use at a pulley's operating position.

Figure 8:
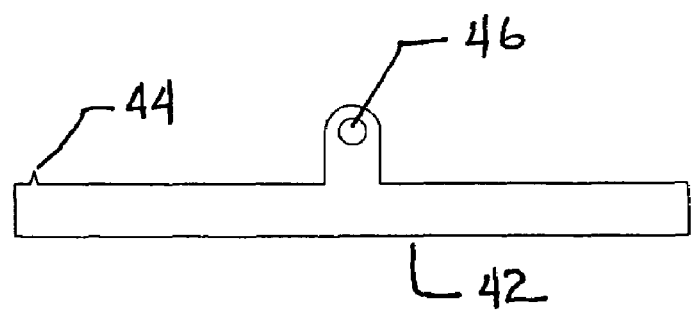
FIG. 8 illustrates is an enlarged view of the adjuster of the sliding gauge member of FIG. 3.

Tooth 44 (shown in FIG. 8) is part of the adjuster 42, which provides the means for moving the sliding gauge member 32. Device 46 is the mechanism that attaches the adjuster 42 to the sliding gauge member 32. Belt gauge 48 measures the width of a belt.

Figure 4:
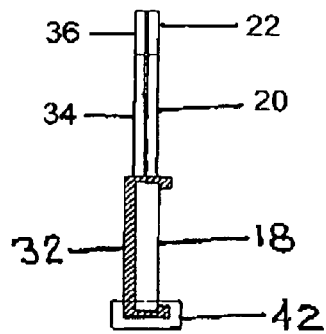
FIG. 4 illustrates a cross-sectional view of the pulley gauge apparatus of FIG. 1.

FIG. 4 illustrates a cross-sectional view of the pulley gauge apparatus 100 of FIG. 1 in the direction indicated by the arrow in FIG. 1.

Figure 5:
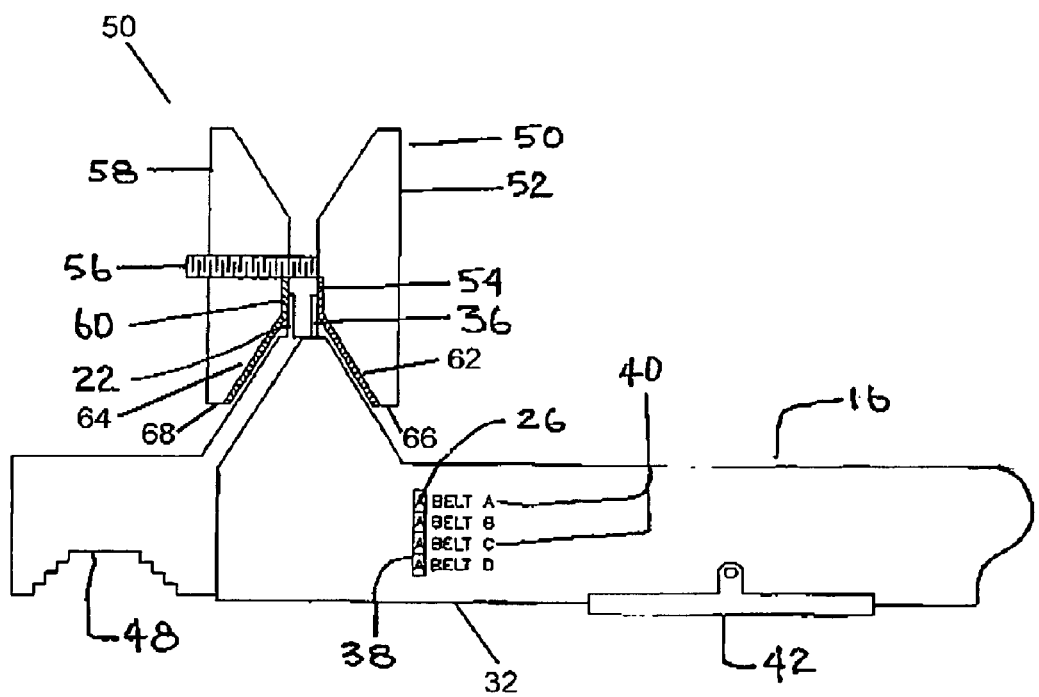
FIG. 5 illustrates the pulley gauge apparatus of FIG. 1 when used in its intended manner with a VPP.

FIG. 5 illustrates the gauge 16 in use with a VPP 50. The fingers 22 and 36 are inserted between the flat surfaces 54 and 60 of sheaves 52 and 58 of VPP 50.

Figure 6:
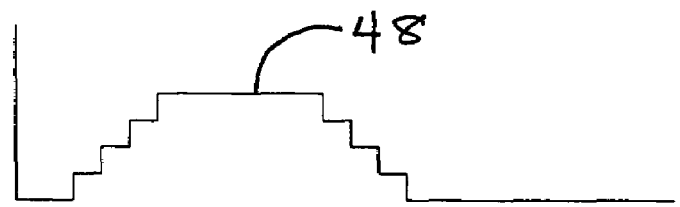
FIG. 6 illustrates an enlarged view of the belt measuring gauge of the fixed gauge member of FIG. 2.
Figure 7:
FIG. 7 illustrates an enlarged view of the rack of the fixed gauge member of FIG. 2.

FIGS. 6 and 7 illustrate an enlarged view of the belt measuring gauge 48 and rack 28 of the fixed gauge member 18.

A method of operating the pulley gauge apparatus 100 will now be described. Assume that the airflow in a room produced by an air handling unit having a 4.75" diameter VPP must be increased from 4000 cubic feet per minute (CFM) to 5000 CFM (i.e., the airflow must be increased to 125% or 1.25 of the initial volume produced by the air handling unit).

First, the operating position of the VPP is measured using the pulley gauge apparatus 100. To measure the operating position of the VPP, with the VPP turned off and the fingers 22, 36 of the fixed gauge member 18 and sliding gauge member 32 closed, fingers 22, 36 are inserted between the flat portions 54, 60 of the sheaves 52, 58 until the edge of the gauge 16 rests on the rims 66, 68 of the sheaves 52, 58, respectively. If the fingers 22, 36 cannot be inserted between the sheaves 52, 58, then the VPP is at a closed position. Then, using adjuster 42, the fingers 22, 36 are moved as far as possible from each other. The operating position 26 of the VPP now can be viewed through the indicator windows 38. For each window 28 that does not indicate an operating position 26 (i.e., for each window 28 that is blank), then the belt size 40 corresponding to that window is too narrow for use at the current operating position.

Figure 9:
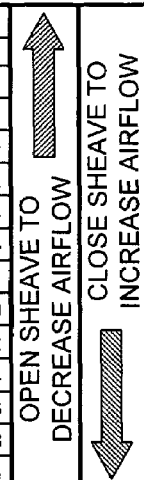
FIG. 9 illustrates an exemplary chart of the pulley gauge apparatus of FIG. 1.

Assume that the operating position of the VPP is determined to be at the "b" position. To determine the new operating position of the VPP to achieve the desired airflow, reference is made to a corresponding pulley chart, such as the chart illustrated in FIG. 9. As shown in FIG. 9, to increase the airflow by 1.25 of the initial volume, the sheaves must be closed ten half turns to position "1". However, before changing the position of the VPP to the new position "1", the gauge 16 is adjusted to operating position "1" to determine the size of the belt required to drive the pulley at the new position. The required belt size at the new position is compared to the existing belt size. If the existing belt is adequate, the operating position of the VPP is changed, and the data for a report is obtained before returning to the room to read the airflow. Unlike the existing methods, only one trip to the roof is required utilizing the present invention.

Many modifications and other embodiments of the invention will come to mind to one skilled in the art to which this invention pertains having the benefit of the teachings presented in the forgoing descriptions and the associated drawings. For example, the operating position of a VPP and the appropriate size of a belt to use at that position can be displayed in a variety of ways including digital readout instead of using pulley operation position indicator 26 and belt indicator 40. As another example, the fingers 22, 36 can serve a dual purpose: to measure the operating position of the VPP and the width of the belt. The process of displaying the operating position of a sheave, selecting the appropriate belt size, and the data for predicting changes in air volume can be compiled into a device with input and output capability. The input capability will enable entering data into the device such as belt and pulley size, velocity, amperage and the like that the device would use in computing the outcome of changing the operating positions of the pulley. This embodiment also comprise of a means of updating the database of the device such that it would keep up with trends in the industry.

Other data that could be programmed into the device could include motor information. Once the operating position of a pulley is measured and the new operating position is determined, the operating characteristics of the motor that drives the pulley can be predicted at the new position. The operating characteristics of the motor could include velocity, amperage, horsepower and the like.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for changing the operating position of a pulley having a first belt size to achieve a desired airflow comprising:
    means for determining a first operating position of a pulley; and
    means for determining a second operating position based on the desired air flow.

2. The apparatus of claim 1 further comprising means for determining a second belt size based on the second operating position.

3. The apparatus of claim 2 further comprising means for measuring the first belt size.

4. An apparatus for changing the operating position of a pulley having a first belt size to achieve a desired airflow comprising:
    a first part having a plurality of operation position indicators arranged to represents a plurality of operation positions of a pulley; wherein the plurality of operation position indicators are arranged in a plurality of rows wherein each row represents a different belt width and each row includes a predetermined number of operation position indicators based on the respective belt width; and a second part having a plurality of windows wherein the plurality of windows are arranged in a column such that the plurality of windows coincide with the plurality of rows of position indicators respectively when the second part overlaps the first part and wherein the plurality of windows are arranged such that each window may display one operation position indicator of the plurality of operation position indicators of a respective row of operation position indicators when the second part overlaps the first part.

5. The apparatus of claim 4 further comprising a chart having a plurality of columns wherein each column represents a first operation position of the pulley; a plurality of rows wherein each row represents a second operation position of the pulley; and each entry of the chart represents a change in airflow if the operation position of the pulley changes from the first operating position to the second operating position.

6. A method for changing the operating position of a pulley having a first belt size to achieve a desired airflow comprising:

determining a first operating position of a pulley based on the space between the sheaves of the pulley; and determining a second operating position based on a desired airflow.

7. The method of claim 6 wherein the second determining step comprises utilizing a chart to determine the second operating position based on the first operating position and a change in desired airflow.

8. The method of claim 6 further comprising determining a second belt size based on the second operating position.

9. A method for changing the operating position of a pulley having a first belt size to achieve a desired airflow comprising:

utilizing a device to determine a first operating position of a pulley based on the space between the sheaves of the pulley; and utilizing the device to determine a second operating position based on a desired airflow.

10. The method of claim 9 wherein the second utilizing step comprising utilizing a chart to determine the second operating position based on the first operating position and a change in desired airflow.

11. The method of claim 9 further comprising utilizing the device to determine a second belt size based on the second operating position and utilizing the device to measure the first belt size.

* * * * *